United States Patent
Sturgill et al.

[11] Patent Number: 6,126,719
[45] Date of Patent: Oct. 3, 2000

[54] RECOVERY OF GROUP III ELEMENT COMPONENT FROM GROUP III-V WASTE MATERIALS

[75] Inventors: Jeffrey Allen Sturgill, Fairborn; Joseph Thomas Swartbaugh, Phillipsburg, both of Ohio

[73] Assignee: The University of Dayton, Dayton, Ohio

[21] Appl. No.: 09/010,375

[22] Filed: Jan. 21, 1998

[51] Int. Cl.[7] ........................................... C22B 7/00
[52] U.S. Cl. .................. 75/586; 75/688; 423/304; 588/246
[58] Field of Search .................. 75/586, 688; 423/304; 588/246

[56] References Cited

U.S. PATENT DOCUMENTS

| | | | |
|---|---|---|---|
| 2,867,526 | 1/1959 | Heath et al. | 423/148 |
| 2,890,139 | 6/1959 | Shockley | 75/10.1 |
| 3,700,413 | 10/1972 | Bienert et al. | 75/706 |
| 4,201,667 | 5/1980 | Liao | 210/721 |
| 4,332,687 | 6/1982 | Daignault et al. | 210/721 |
| 4,339,302 | 7/1982 | Faktor et al. | 117/61 |
| 4,362,560 | 12/1982 | Abrjutin et al. | 75/407 |
| 4,489,046 | 12/1984 | Petersson et al. | 588/234 |
| 4,808,221 | 2/1989 | Clement, II et al. | 423/88 |
| 4,812,167 | 3/1989 | Inooka | 75/416 |
| 4,828,608 | 5/1989 | McNamara et al. | 75/10.14 |
| 4,888,051 | 12/1989 | Bollong et al. | 75/10.11 |
| 5,110,353 | 5/1992 | Li et al. | 75/703 |
| 5,114,592 | 5/1992 | Schuster et al. | 210/667 |
| 5,348,662 | 9/1994 | Yen et al. | 210/717 |
| 5,358,643 | 10/1994 | McClintock | 210/709 |
| 5,370,800 | 12/1994 | Stevenson | 210/710 |
| 5,378,366 | 1/1995 | Yen | 210/667 |
| 5,458,669 | 10/1995 | Maeda et al. | 75/10.67 |
| 5,518,633 | 5/1996 | Brown et al. | 210/713 |

FOREIGN PATENT DOCUMENTS

| | | |
|---|---|---|
| 120 861 | 7/1976 | Germany. |
| 159 421 | 3/1983 | Germany. |

OTHER PUBLICATIONS

Lide, D. CRC Handbook of Chemistry and Physics. CRC Press:Boca Raton. 1998. p. 4–58.
Chem. Abst. 95:46865a (Can. Pat. No. 1,094,328), May 1977.
Chem. Abst. 102:169190x (Jpn. Pat. No. 59,213,622), Dec. 1984.
Chem. Abst. 102:188619k (Jpn. Pat. No. 60 27,613), Feb. 1985.
Chem. Abst. 103:9557q (Jpn. Pat. No. 60 24,331), Feb. 1985.
Chem. Abst. 110:177135p (Jpn. Pat. No. 63,270,427), Apr. 1987.
Chem. Abst. 110:177136q (Jpn. Pat. No. 63,270,428), Nov. 1988.

(List continued on next page.)

*Primary Examiner*—Jill Warden
*Assistant Examiner*—Tima McGuthry-Banks
*Attorney, Agent, or Firm*—Killworth, Gottman, Hagan & Schaeff, LLP

[57] ABSTRACT

The present invention is directed to an apparatus and method for recovering the group III elemental component of a group III-V material waste material. The method includes heating, under a reduced pressure, solid waste materials which contain group III-V material to cause the group III-V material to separate into a group III element and a group V element vapor; drawing off the group V element vapor; condensing the group V element vapor to produce a condensed group V element solid; and zone refining the group III element to produce a purified group III element. The apparatus is designed to carry out this method in the plant which manufactures the group III-V waste material.

20 Claims, 5 Drawing Sheets

OTHER PUBLICATIONS

*Chem. Abst.* 110:177137r (Jpn. Pat. No. 63,270,430), Nov. 1988.

*Chem. Abst.* 110:177138s (Jpn. Pat. No. 63,270,431), Nov. 1988.

*Chem. Abst.* 110:177159z (Jpn. Pat. No. 01 04,433), Jun. 1987.

*Chem. Abst.* 111:100788s (Jpn. Pat. No. 01 47,825), Feb. 1989.

*Chem. Abst.* 105:82977x (Jpn. Pat. No. 61 76,627), Apr. 1986.

*Chem. Abst.* 109:194374n (U.S. Pat. No. 4,759,917), Jul. 1988.

*Chem. Abst.* 109:153569m (Bartlett, "Separation of Arsenic and Gallium form Mixed Gallium Arsenide Electronic Scrap," *Arsenic Metall. Fundam. Appl., Proc. Symp.* 1988: 385–400, no month.

*Chem. Abst.* 110:177135m (Jpn. Pat. No. 63,270,425), Nov. 1988.

*Chem. Abst.* 110:177134n (Jpn. Pat. No. 63,270,426), Nov. 1988.

*Chem. Abst.* 112:220719n (Jpn. Pat. No. 01 191,753), Aug. 1989.

*Chem. Abst.* 112:150111g (Jpn. Pat. No. 01 179,712), Jul. 1989.

*Chem. Abst.* 120:328097n (Jpn. Pat. No. 06 65,658), Mar. 1994.

Bird et al., "Production of High–Purity Gallium From Scrap Gallium," *Hydronet Copper, Its Byprod. Rarer Met., Proc. Dallas Symp.* pp. 59–64, 1982. No month.

Yamashita et al, "Recovery of Individual Metals from Gallium–Arsenic–Indium Semiconductor Wastes by Flotation," *Anal. Sci.* vol. 6, pp. 783–784, Oct. 1990.

Jadvar et al., "Recovery of Gallium and Arsenic from GaAs Wafer Manufacturing Slurries," *Env. Progress* vol. 10, No. 4, pp. 278–281, Nov. 1991.

RECOVERY OF GROUP III ELEMENT COMPONENT FROM GROUP III-V WASTE MATERIALS

STATEMENT REGARDING FEDERALLY SPONSORED RESEARCH OR DEVELOPMENT

The United States Government has rights in this invention pursuant to Contract No. CR 82 180808-01-0 awarded by the United States Environmental Protection Agency.

BACKGROUND OF THE INVENTION

The present invention relates to a method for the recovery of the elemental components of solid waste materials containing group III-V elements and group V elements which are generated during the production of III-V semiconductors.

Semiconductor devices formed from group III elements and group V elements, such as, for example, gallium arsenide (GaAs), gallium phosphide (GaP) and indium phosphide (InP), are used for a multitude of military and industrial applications, such as lasers, light-emitting diodes and communications devices, in the United States and throughout the world. Manufacturing processes devoted to the fabrication of these devices generate large volumes of waste materials which contain valuable gallium and indium. Low-cost procedures devoted to the recovery of these metals are economically advantageous to the manufacturer of group III-V materials.

Manufacturers grow bulk crystals of group III-V materials in large boules or ingots. The manufacturer performs a number of processing steps wherein the boules are examined for their crystallographic orientation and then cut and slabbed into wafers. This cutting and slabbing operation produces a large volume of solid wastes, which range in size from micron-sized fine particles to boule ends and large crystal pieces. Conventional sawing operations utilize a single revolving metal blade impregnated with diamond or other hard abrasive; newer and more time-efficient designs utilize numerous abrasive-coated wires which run back and forth simultaneously over the crystal surface. The cutting and slabbing process generally results in two waste streams—fines and small particles that are carried out with the cutting lubricant, and larger pieces that remain behind. Fines are typically removed from the oil or water lubricant either through centrifugation or a settling process; larger pieces are hand sorted for either disposal or reuse. The decision to recycle or discard larger pieces often depends upon whether the original boule was doped or undoped with other chemical elements (e.g. silicon), or how "contaminated" it might be with other materials from the sawing operation (such as abrasive, saw mount material, etc.)

Due to the economic value of gallium, a number of recovery methodologies have been developed and tested over the years to recover gallium from gallium arsenide waste materials. The first step in these processes is typically to separate the gallium and arsenic. A known method to accomplish this separation is to contact the solid waste with a large volume of an aqueous solution or a heated bath, allowing a chemical reaction to facilitate separation. These separation media typically consist of oxidizing species such as hydrogen peroxide, nitric acid, or sodium hydroxide. Once in solution or in the heated bath, the gallium is then sequentially removed using a number of additional methodologies. While these practices have been demonstrated as workable, they involve the introduction of a larger-volume medium to effect separation. This larger-volume medium must then itself be treated (e.g., to preclude the release of toxic arsenic and/or to recover gallium). Thus, rather than separating the constituent elements from one another, these approaches require further processing for metal recovery from a much larger waste stream.

Thermal processing of GaAs solid wastes to recover gallium has also been demonstrated in the past. While thermal separation under air has been achieved for GaAs, this results in the formation of arsenic and gallium oxides. For material recovery, these oxide "slags" require an additional processing step (reduction) to obtain reusable metals. Therefore, separating under an inert atmosphere or under vacuum is desirable in order to minimize the number of processing steps and subsequently the overall cost of the recovery operation. Separating under an inert atmosphere or vacuum has been attempted, and many of the processes require particular conditions for thermal separation. However, recovery and purification processes for group V elements have not been correspondingly developed. For example, U.S. Pat. No. 4,812,167 to Inooka teaches that fine GaAs particles are first "calcined" at 400° C. in order to coke binding oils, which prevents fine materials from being removed under vacuum. Separation of gallium and arsenic is then achieved at a temperature range of between 1050° C. and 1150° C. and a pressure from $10^{-4}$ to $10^{-1}$ Torr. The liquid gallium is then purified by heating it to between 1000° C. and 1500° C. (at ambient pressure) and removing the surface layer. However, no recovery or purification of arsenic is attempted in that process. This is the case in all other reported thermal separations—liquid gallium is recovered, but condensed arsenic is disposed of, presumably due to its low cost.

As another example, U.S. Pat. No. 4,362,560 to Abrjutin et al. teaches a vacuum thermal separation process for the recovery of gallium from gallium arsenide semiconductor wastes. The process involves vacuum thermal separation of the waste, sublimation of arsenic and condensation thereof, cooling of the gallium melt, filtration of the gallium melt and a hydro-chemical treatment of the gallium melt with nitric acid or sulfuric acid, followed by purifying crystallization of the gallium melt after the hydro-chemical treatment. All of the steps of the Abrjutin et al. process are conducted at or above the melting point of gallium. This process also introduces another liquid into the recovery process, the hydro-chemical treatment fluid, and further fails to recover the arsenic. Additionally, the washing of the gallium melt with nitric acid and/or sulfuric acid is a difficult process to successfully carry out.

Group III-V material semiconductor waste materials range in size from entire boules to fine dust. Typically, current methodologies only recycle the very largest pieces. However, the smaller particles represent nearly 50% of the produced wastes making their recovery desirable. Under vacuum conditions, however, the smaller size pieces would be carried toward the vacuum pump due to their smaller mass and, for that reason, recovery entails coalescing these smaller particles into a mass with sufficient weight to resist transport under vacuum. U.S. Pat. No. 4,812,167 to Inooka describes a process in which binding oils are "calcined" at 400° C. to bind smaller particles together. However, such a process is undesirable for binding the particles because it introduces a significant measure of carbon contamination into the material to be separated. The additional carbon affects the electronic performance of components fabricated from the recycled materials.

One problem with current disposal methodologies is that GaAs, GaP and InP may be converted to toxins, such as arsine ($AsH_3$) and phosphine ($PH_3$), after exposure to acidic concentrations. Arsine gas is lethal in concentrations as low as 250 ppm while lower concentrations result in chronic effects. Phosphine exhibits a comparable toxicity. Landfills are typically anaerobic (reducing) environments, which simultaneously form organic acids such as acetic and formic acids. GaAs, GaP and InP exposed to typical landfill conditions can be easily converted to arsine and phosphine gases. Even if released, arsenic is oxidized to the trivalent or pentavalent state and aqueous-phase arsenic still represents a measurable toxic environmental threat.

Another problem with existing recycling approaches is that only the metal gallium is being recovered, purified, and recycled back into the overall semiconductor manufacturing process. On a material weight basis, approximately 90% of solid GaAs wastes are currently disposed of, and 10% are recycled. Typically, only undoped pieces having thicknesses greater than 0.25 inch (0.63 cm) are recycled. Arsenic is not presently being recovered from GaAs because arsenic is very inexpensive from a raw materials cost standpoint, and it is, therefore, less expensive to simply purchase virgin raw arsenic for crystal growth. Indium, from InP semiconductor production, is not presently being recycled because the process utilized to recover GaAs, when applied to InP, results in the formation of elemental phosphorous, which is a significant fire hazard. For this reason, recyclers refuse to accept InP wastes and, for similar reasons, GaP.

Although the prevailing attitude within the group III-V material bulk crystal manufacturing industry maintains that the existing disposal and recycling approaches are satisfactory, no methodologies have been developed to recover indium, phosphorus or arsenic. Under existing U.S. environmental laws, the original crystal manufacturer is liable for any future environmental cleanup costs relating to environmental hazards caused by the crystal materials that it produces, with or without recycling of the gallium from the waste stream. Perhaps the only reason why such costs have not begun to be incurred by today's crystal manufacturers is that the industry is still in its infancy, and so environmental damage that is directly attributable to III-V semiconductor manufacture has not yet been observed. Judging from the large monetary sums currently being awarded to localities (for liabilities) and environmental contractors (for cleanup) for, for example, disposal of arsenic-containing wood preservatives, it is safe to predict that the future holds some very unpleasant economic surprises for today's crystal manufacturers if approaches are not altered to allow for recovery and reuse group III elements other than gallium and group V elements.

Recycling of both the group III element and the group V element from III-V manufacturing wastes back into the crystal-growing operation yields both short-term and long-term economic benefits. For these reasons, a need currently exists in the art for a method and apparatus which can be used to recover the elemental components of group III-V semiconductor solid waste materials so that they can be recycled into the crystal growing process.

SUMMARY OF THE INVENTION

The present invention solves the current needs in the art by providing a method and apparatus for the recovery of the elemental components of III-V semiconductor solid waste products so that these elemental components can be recycled back into the III-V crystal growing process. The method is particularly geared to the recovery of the group III element component of group III-V waste materials. Further, the method and apparatus of the present invention have been developed so that they can be employed in their entirety at a group III-V material crystal growing facility, unlike existing art methods and apparatuses which are used off-site.

One aspect of the present invention is directed to a method for the recovery of the components of solid waste materials containing group III-V materials. The method includes heating, under a reduced pressure in the presence of an inert gas, solid waste materials which contain group III-V material to cause the group III-V material to separate into a group III element and a group V element vapor; drawing off the group V element vapor; condensing the group V element vapor to produce a condensed group V element solid; and zone refining the group III element to produce a purified group III element. Desirably, the condensed group V element solid is either sublimated and recondensed to produce a more pure group V element solid or is oxidized.

Another aspect of the present invention is directed to a method for the recovery of a group III element and arsenic from solid waste materials containing a group III element arsenide. The method includes heating, under a reduced pressure, solid waste materials containing a group III element arsenide to separate the solid waste materials into a group III element and arsenic vapor; drawing off the arsenic vapor; condensing the arsenic vapor into solid arsenic; refining the solid arsenic; and zone refining the group III element to produce a refined group III element. Desirably, the step of refining the solid arsenic further includes the steps of sublimating the solid arsenic into arsenic vapor and condensing the arsenic vapor into a more pure form of the solid arsenic. Alternately, the solid arsenic can be purified by repeatedly sublimating and condensing the solid arsenic.

Another aspect of the present invention is directed to a method for the recovery of a group III element from solid waste materials containing a group III element phosphide. The method includes heating, under a reduced pressure, solid waste materials containing a group III element phosphide to separate the solid waste materials into a group III element and phosphorus vapor; drawing off the phosphorus vapor; condensing the phosphorus vapor into solid phosphorus; oxidizing the solid phosphorus; and refining the group III element by zone refining to produce a refined group III element. Desirably, the solid phosphorus is oxidized with a transition metal salt and the elemental transition metal produced by the oxidation of the phosphorus metal is salvaged.

Still another aspect of the present invention is directed to an apparatus useful to separate solid wastes containing group III-V materials. The apparatus includes a reactor in which a solid waste material containing a group III-V material solid is thermally separated into a group III element and a group V element vapor. A heating source is positioned in heat transfer contact with the reactor to heat the reactor. A conduit extends out of the reactor. A condensing unit in which the group V element vapor is condensed into a solid group V element is connected to the reactor by the conduit. A vacuum pump to reduce the pressure in the reactor is connected with the condensing unit so that the group V element vapor can be drawn out of the reactor and into the condensing unit through the first conduit. The apparatus also includes a zone refining unit to which the group III element is desirably transferred and in which the group III element is refined.

It is also desirable that the apparatus further include either a refining unit for the group V element or an oxidation unit for the group V element. In one embodiment, the refining unit includes a series of condensing and reheating units which purify the group V element vapor by repeated sublimation and condensation of the group V element. In another embodiment, the oxidation unit includes a reservoir in which an oxidizing solution can be contained. The reservoir is in fluid communication with the condensing unit and the oxidizing solution is provided to oxidize the group V element.

Desirably, the zone refining unit includes a circular refining pan having a channel formed therein. The apparatus also includes a motor which rotates the refining pan and a heat unit which heats the refining pan. A mask having a slot formed therein is positioned between the heat unit and the refining pan. The slot is positioned so that the heat unit heats only a portion of the pan. The zone refining unit may optionally include a cooling element, which is in heat transfer contact with the refining pan, to cool the refining pan.

It is an object of the present invention to provide a process and apparatus for the recovery of the group III element from a group III-V material solid waste. Other objects and advantages of the invention will be apparent from the following detailed description, the accompanying drawings and the appended claims.

DETAILED DESCRIPTION OF THE INVENTION

Figure 1:
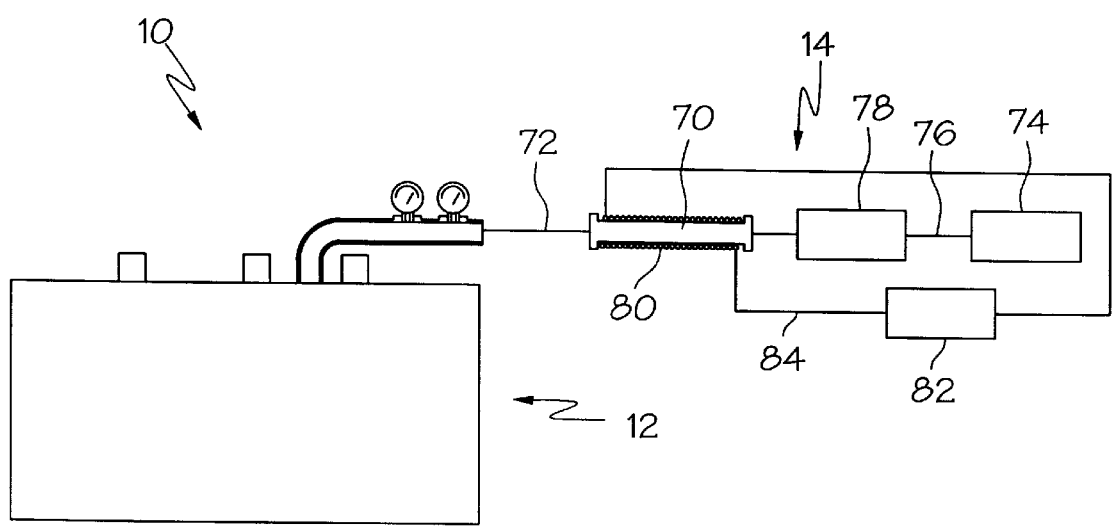
FIG. 1 is a schematic view of an apparatus which can be used to recover the elemental components of group III-V waste materials.

The process of the present invention provides a methodology for the separation and recovery of the elemental components of III-V metal waste materials. By "elemental components," it is meant that the process of the present invention can be used to separate a group III-V material semiconductor waste into a group III element component and a group V element component. The recovered components are then refined so that they can be recycled back into the manufacturing process for group III-V materials. By recovering and, desirably recycling, these materials, the amount of waste products, especially toxic waste products, introduced into the environment is reduced. Further, recycling of these materials will reduce raw material costs. The process of the present invention is useful with most, if not all, group III-V materials. The process is particularly useful in recovering the elemental components of gallium phosphide, gallium arsenide, gallium antimonide, indium phosphide, indium arsenide, and indium antimonide. The process of the present invention is especially useful to recover the elemental components of gallium arsenide, indium phosphide and gallium phosphide.

One aspect of the process of the present invention is directed to a method for the recovery of the components of solid waste materials containing group III-V material. In this process, solid waste materials which contain group III-V materials are heated to cause the group III-V material contained in the waste material to separate into a group III element and a group V element vapor. The group III-V material is desirably heated to a temperature from about the melting point of the group III-V material minus 200° C. to about the melting temperature of the group III-V material. Table 1 presents the desired approximate separation temperature ranges for various group III-V materials.

TABLE 1

Desired Separation Temperatures for Group III-V Materials

| Group III-V Material | Melting Temperature (° C.) | Separation Temperature (° C.) |
| --- | --- | --- |
| GaAs | 1238 | 1000–1250 |
| GaP | 1465 | 1250–1475 |
| InAs | 943 | 740–950 |
| InP | 1070 | 870–1100 |
| InSb | 535 | 335–540 |

As the group III-V material is heated, it separates into a group V element vapor and a liquid group III element. To prevent the formation of oxidation products of the reactants and to aid in drawing off the group V element vapor, the group III-V material is heated under a reduced pressure in the presence of an inert gas and/or in an oxygen free environment. Oxidation products are undesirable because they complicate the recovery process by requiring an additional reaction, typically a reduction reaction, be performed to place the group III element and the group V element in condition for recycling. The reduced pressure also increases the rate at which the thermal separation reaction takes place. Desirably, a pressure as low as possible is used. It has been found that the separation reaction proceeds well at a pressure of from about $10^{-1}$ Torr to about $10^{-5}$ Torr. To further inhibit the formation of oxidation products of the reactants and to serve as a carrier vapor, an inert gas, such as nitrogen or argon, can be fed into the system in which the group III-V material is heated. If used, the inert gas is desirably fed into the system in which the thermal separation reaction takes place after the system has been heated to about 500° C.

During the thermal separation process, the group III element component of the group III-V material liquefies and partially separates from the solid group III-V material and the contaminants. Because the liquified group III element is more dense than the solid group III-V material, the solid group III-V material and associated contaminants will "float" on top of the liquified group III element. This "floating" of the solid group III-V material and contaminants results in an initial, and at least partial, separation of the group III element from the solid group III-V material and associated contaminants. Depending on the amount of time the group III-V material is heated, most of the group III material will separate from the group III-V waste material.

The evolved group V element vapor is collected and condensed. Desirably, the group V element vapor is condensed in a condensing unit. To prevent condensation of the group V element while it is transferred to the condenser, the group V element is desirably transferred to the condensing unit by means of a heated line. Desirably, the group V element is condensed in a condensing unit which contains a plurality of coated steel bearings or other large surface area material to provide a greater surface area for condensation. Once the group V element vapor is condensed, it can either be recovered or disposed of.

Because some group V elements, such as phosphorus, are flammable once condensed, the recovered group V element can be oxidized to a less flammable state. The form of phosphorus which results from the operation described above, followed by condensation, is white phosphorus which is a combustion hazard. Therefore, it is desirable to oxidize the phosphorus to an innocuous form, such as phosphate, while simultaneously precluding the presence of air and maintaining a low temperature. Oxidation to phosphate is accomplished through the combination of an aqueous salt of a transition metal, such as copper, silver or cobalt with the phosphorus. Desirably, copper sulfate solution is used. The use of oxidizers, such as peroxide, nitrate or permanganate would result in detonation and, for that reason, they are not used.

Certain other group V elements, such as arsenic, can be refined and recycled into the group III-V material manufacturing process. To purify the group V element, it can be sublimated and recondensed to produce a more pure group V element. To reach a desired purity level, i.e., a purity level at which the group V element can be recycled into the group III-V material manufacturing process, the group V element can be repeatedly sublimated and condensed.

Once the reaction has been conducted for a desired period of time, which is desirably long enough to completely separate the group III-V material into its elemental components, the remaining group III element and the waste materials are allowed to cool. The group III element and the waste materials are cooled under the reduced pressure and, desirably, in the presence of the inert gas. This cooling process forms a solid mass containing the separated group III element, which is partially purified, and a solids portion which contains the waste materials.

The solid mass is then heated to about the melting point of the group III element so that the partially purified group III element can be separated from the waste materials. This separation is accomplished by either skimming the waste materials from the top of the melt because the liquid group III element is more dense than the waste materials, by draining the group III element from the waste materials or by pouring the liquid group III element through a filtering medium. While some of the group III element has a tendency to adhere to the waste materials because of the high surface tension of the group III element, the separation temperature can be increased to increase the amount of group III element separated from the waste materials. The group III element is desirably filtered to further separate the solids portion from the group III element. One skilled in the art will appreciate that the filtering medium must be formed from a material which is not corroded by the liquid group III element. Desirably, the filtering medium is formed from a refractory, non-metallic material such as graphite, quartz, alumina or boron nitride.

The group III element is then refined to further purify it. To refine the group III element, the solid mass is heated and cooled, desirably repeatedly. Such a process is similar to a zone refining process and shall be referred to herein as a zone refining process. To refine the group III element, the group III element is heated to a temperature above its melting point and below its boiling point and then allowed to cool. As the group III element cools and begins to solidify, the contaminants are forced to the surface of the solid mass and then are separated from the group III element. This is accomplished by any of the separation methods described above. The group III element is desirably filtered to further separate the contaminated portion from the group III element. Useful filtering materials are described above. This process results in an increasingly pure portion of the group III element with each heating and subsequent cooling of the solid mass.

Alternatively, the group III element can be refined in a conventional zone refining apparatus. A conventional zone refining apparatus employs the zone refining process described above. In a zone refining apparatus, the group III element is placed in a receptacle and exposed to a heat source which causes a portion of the solidified group III element to liquify and form a melt. The receptacle is moved in relation to the heat source so that the portion of the group III element which is liquified is moved. Impurities, which were contained in the group III element solid portion, are moved along with the melt while the portion which remains behind is purified. If necessary, i.e., if the group III element has a low melting point, the receptacle may be contacted with a cooling element to resolidify the portion of the group III element not exposed to the heat source. Useful cooling elements include refrigeration units or cooling baths which contain a coolant, such as ice water, chilled isopropanol, freon or dry ice. The zone refining step is continued until a desired purity level is attained.

Eventually, the zone refining process results in a group III element portion having a purity level of from about 4N to about 6N or from about 99.99% pure to about 99.9999% pure. At this level of purity, the group III element has a purity such that it can be recycled back into the semiconductor manufacturing process. It has been discovered that, with the process of the present invention, when the group III element is gallium, it is not necessary to refine the gallium in a zone refining apparatus if the desired end product is a gallium product useful to form semi-insulating materials. However, if the group III element is indium or the gallium is desired for use in forming semiconductors, then the group III element must be zone refined in a zone refining apparatus.

To facilitate the separation of the group III-V material into its elemental components and the subsequent recovery and purification of those components, fine particulate waste materials are desirably pelletized before the group III-V material is heated. This precludes the introduction of contaminants, such as binding oils used in prior methods, into the separation process. Desirably, the fine particles are first separated from the majority of contained oil or water lubricant through either a low-temperature (<150° C.) evaporation step or through washing with an appropriate solvent, such as, for example, a surfactant, an alkaline cleaner or a hydrocarbon solvent. The fine particles are then pelletized by introducing the fine particles into a mold and applying pressure to fuse the particle edges together to form pellets. The pellets are then heated in combination with the larger particles of the group III-V material waste.

More desirably, the process of the present invention is directed to a method for the recovery of a group III element and arsenic from solid waste materials containing a group III element arsenide. This process is particularly useful for recovering gallium and arsenic from gallium arsenide waste materials. In this more desirable version of the process, the group III element arsenide is heated under a reduced pressure to cause the thermal separation of the group III element arsenide into a group III element and arsenic vapor. Desirably, the group III element arsenide is heated to from about the melting temperature of the group III element arsenide minus 200° C. to about the melting temperature of the group III element arsenide. For example, if the group III metal arsenide is gallium arsenide, it is heated from about 1000° C. to about 1200° C. As another example, if the group III metal arsenide is indium arsenide, then it is heated to from about 740° C. to about 950° C. The pressure is reduced to from about $10^{-1}$ Torr to about $10^{-5}$ Torr. It is further desirable that fine particles of the group III element arsenide waste material be pelletized before heating. To further prevent contamination and oxidation, the group III-V material can be separated in the presence of an inert gas.

The arsenic vapor is drawn off from the separation reaction to a condensing unit in which the arsenic is condensed into solid arsenic. Desirably, the arsenic vapor is transferred to the condensing unit by means of a heated line to prevent any condensation of the arsenic during transfer. The arsenic is condensed by reducing the temperature of the arsenic to a temperature below its condensation point. The solid arsenic is then refined by sublimating the solid arsenic to a vapor and then condensing the vapor to form a more pure form of the solid arsenic. Desirably, the solid arsenic is purified by repeated sublimation and condensation. The number of times the arsenic is sublimated and condensed is primarily determined by the desired final purity.

The group III element is then separated from the waste materials, as described above, and then refined by one of the zone refining processes, which are also described above.

Another aspect of the process of the present invention is directed to a method for the recovery of a group III element and the destruction of evolved phosphorus from solid waste materials containing a group III element phosphide. This process is particularly useful for recovering gallium from gallium phosphide or indium from indium phosphide. In this aspect of the process, the group III element phosphide is thermally separated into a group III element and phosphorus vapor. Desirably, the group III element phosphide is heated to from about the melting temperature of the group III element phosphide minus 200° C. to about the melting temperature of the group III element phosphide. For example, if the group III metal phosphide is gallium phosphide, it is heated from about 1250° C. to about 1475° C. As another example, if the group III metal phosphide is indium phosphide, then it is heated to from about 870° C. to about 1 100° C. The pressure is reduced to from about $10^{-1}$ Torr to about $10^{-5}$ Torr. It is further desirable that fine particles of the group III element phosphide waste material be pelletized before heating. To further prevent contamination and oxidation of both the group III element and the group V element, the thermal separation reaction may take place in the presence of an inert gas. To further prevent contamination and oxidation, the group III-V material can be separated in the presence of an inert gas, such as that described above.

The group III element is separated from the waste materials, as described above, and then refined by the zone refining processes, also described above.

The phosphorus vapor produced in the thermal separation reaction is drawn off into a condensing unit in which it is condensed to both white and yellow phosphorus. Because both white and yellow phosphorus are flammable in air and produce toxic fumes, the recovered phosphorus is subjected to an oxidation reaction in which the recovered phosphorus is oxidized with an aqueous oxidizing material. Useful oxidizing materials include aqueous salts of transition metals such as copper, silver and cobalt. Desirably, the oxidizing material is copper sulfate. If copper sulfate is used to oxidize the recovered phosphorus, then elemental copper produced by the oxidation reaction can also be recovered. If a silver salt is used, then the metallic silver can also be recovered.

The processes of the present invention can be carried out in the apparatus 10 shown in FIG. 1. The apparatus 10 comprises a reactor 12, a condensing unit 14 and a zone refining unit 16. The group III-V material is thermally separated in reactor 12. The group V element vapor, which is produced in the thermal separation reaction, is drawn off the reactor 12 to the condensing unit 14 by means of a vacuum pump 74. The group III element, which is also produced by the thermal separation reaction, is transferred to the zone refining unit 16 in which it is refined.

Figure 2:
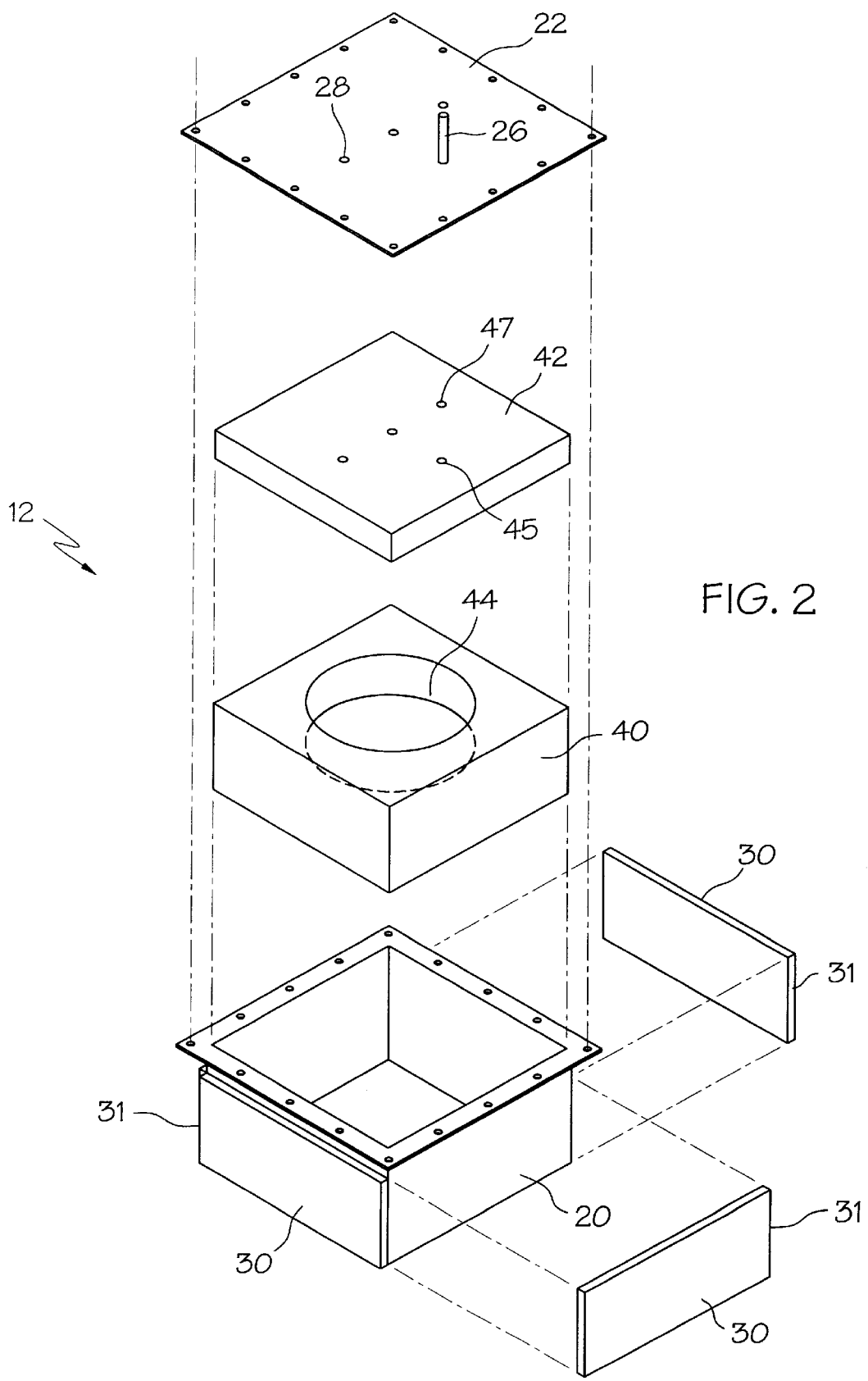
FIG. 2 is an exploded view of the reactor used to thermally separate the group III-V material.
Figure 3:
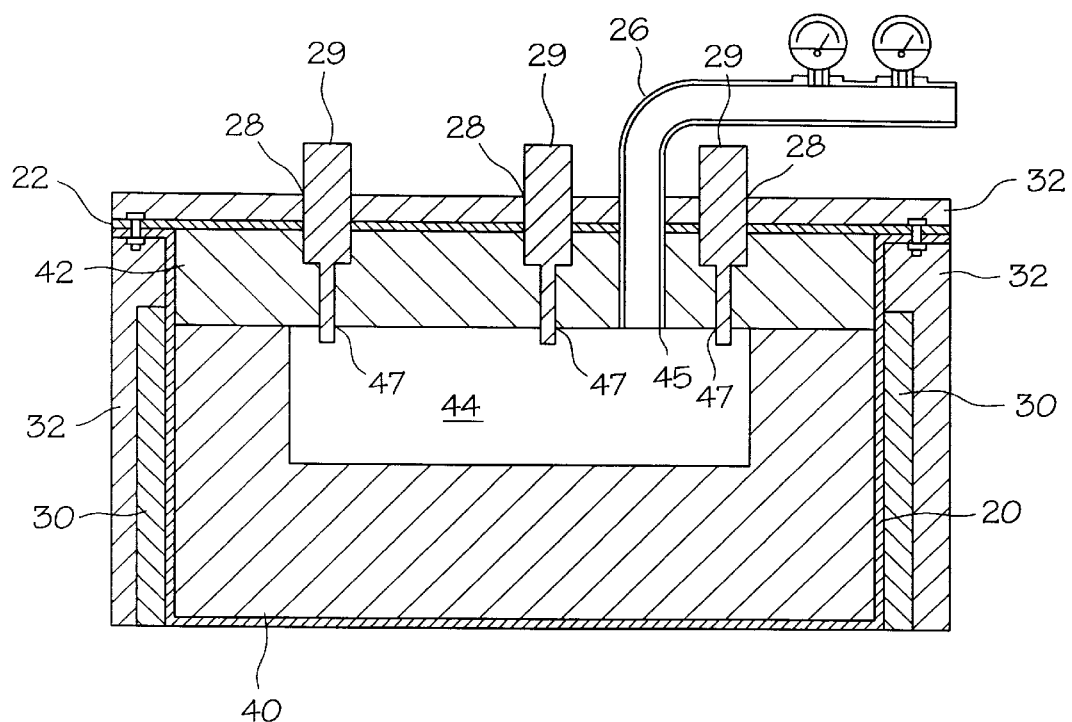
FIG. 3 is a cross sectional view of the reactor.

The reactor 12, as shown in FIG. 2 and FIG. 3, has a shell 20 which is covered with a top 22. A gasket, not shown, is provided to seal top 22 and shell 20. Shell 20 provides a vacuum seal for reactor 12. For that reason, shell 20 is formed from a material strong enough to provide structural integrity for reactor 12 under reduced pressures and high temperatures, therefore, a material such as steel is useful. A conduit 26 extends from top 22. Top 22 further includes at least one aperture 28 through which a temperature determining device, such as a thermocouple 29, can be inserted to determine the temperature in the reactor 12.

Shell 20 is in heat transfer contact with a heat source 30 which is used to heat reactor 12. Heat source 30 may be a single piece or a plurality of panels, such as panels 31, which are shown in FIG. 2. Heat source 30 can be any device which can provide heat sufficient to cause the thermal separation of a group III-V material. Heat source 30 can be an item such as, for example, an electric resistance heating element, an induction furnace or a microwave-type generator. Desirably, heat source 30 is an electric resistance heating element. For gallium arsenide and indium phosphide, heat source 30 can be composed of a standard resistance heating element such as chrome-aluminum. For gallium phosphide and group III-V elements requiring higher separation temperatures, a more specialized material, such as silicon carbide, must be used due to higher operating temperatures. As can be seen in FIG. 3, shell 20 is surrounded with an insulation material 32. Insulation material 32 is also positioned on top 22.

With continuing reference to FIGS. 2 and 3, a reactor core 40 is positioned inside shell 20 in heat transfer contact with shell 20. Reactor core 40 includes a removable top portion 42 which is positioned beneath top 22 of shell 20. Top portion 42 forms a reaction chamber 44 with reactor core 40. Top portion 42 includes an aperture 45 through which conduit 26 also extends into reaction chamber 44. Finally, top portion 42 also includes at least one other aperture 47 through which a temperature determining device, such as thermocouple 29, can be inserted into reaction chamber 44. Because of the corrosive nature of some elements, such as gallium, generated during thermal separation of group III-V materials toward most metals, the portions of reactor core 40 and the removable top portion 42 of reactor core 40 which come into contact with the semiconductor waste materials and their elemental components must be formed from a refractory material. Desirably, reactor core 40 and removable top portion 42 are formed from a non-metallic, refractory material, such as silicon carbide, graphite, quartz, boron nitride or alumina.

Returning to FIG. 1, condensing unit 14 includes at least one condenser 70. Condenser 70 is connected to reactor 12 by a conduit 72 which connects with conduit 26. Vacuum pump 74 is provided to reduce the pressure in reaction is chamber 44 and to draw the group V element vapor into condenser 70. A conduit 76 connects vacuum pump 74 with condenser 70. A molecular sieve 78 is desirably positioned between condenser 70 and vacuum pump 74 to prevent any particulate matter, fines or group V element, whether in solid form or vapor form, from being drawn into vacuum pump 74. Condenser 70 is surrounded with cooling coils 80 which are in heat transfer contact with condenser 70. Coolant is supplied to cooling coils 80 by a fluid pump 82 through a coolant line 84. Useful coolants include water, including tap water, and other useful refrigerants. If the coolant is tap water, then fluid pump 82 will desirably be a water tap.

With continuing reference to FIG. 1, zone refining unit 16 is positioned near reactor 12. Desirably, zone refining unit 16 is located in a position such that a liquified group III element can be transferred from the reactor 12 to the zone refining unit 16. However, one skilled in the art will appreciate that it is not necessary for the group III element to be in a liquid state when placed in the zone refining unit 16. Thus, the group III element can be transferred to the zone refining unit 16 either manually or mechanically, for example, through an additional conduit.

Figure 6:
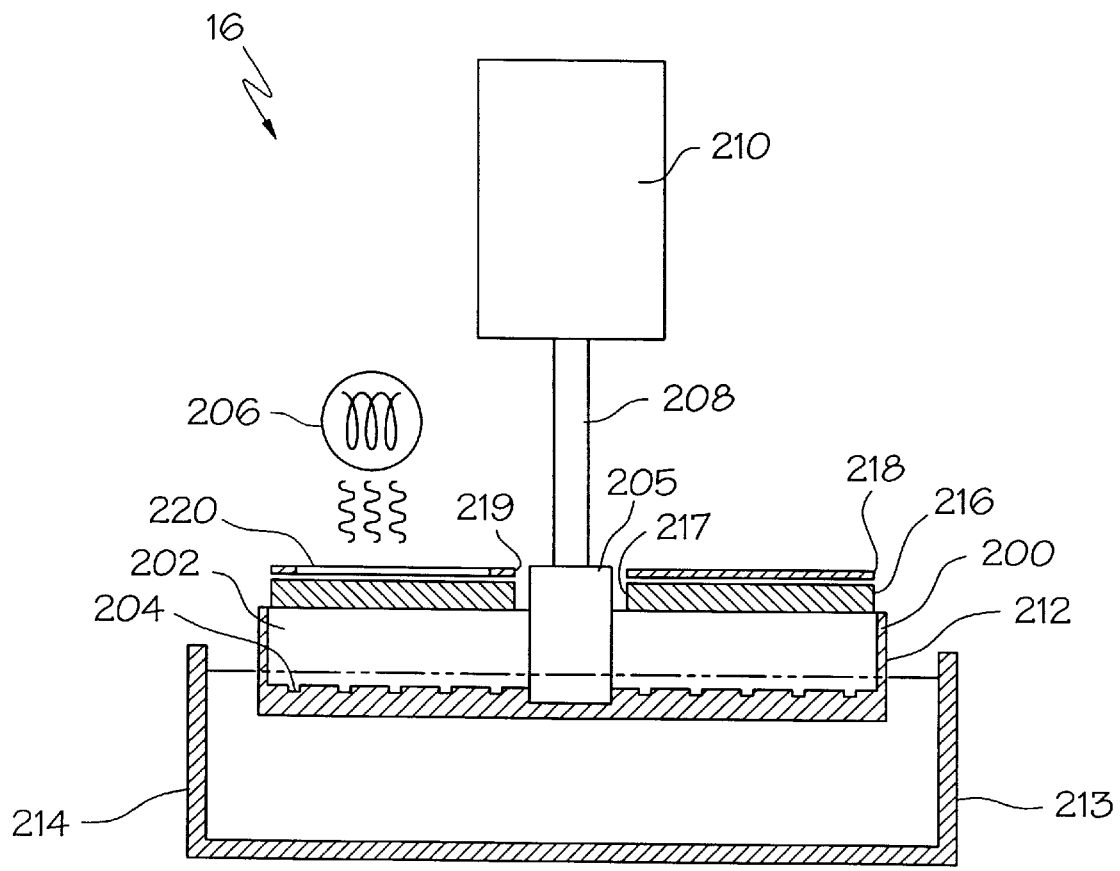
FIG. 6 is a cross sectional view of the zone refining unit used to refine the group III element.

As shown in FIG. 6, zone refining unit 16 includes a circular pan 200 in which the group III element is placed for the zone refining process. By using a circular pan 200 as opposed to a linear unit, the zone refining unit 16 occupies a smaller area of floor space. However, one of skill in the art will understand that a linear unit would also be useful. Pan 200 has an interior surface 202 in which at least one circular, and desirably spiral, channel 204 is formed. A heat source 206 is positioned above pan 200 to heat pan 200 and melt the group III element as it rests in pan 200. Heat source 206 can be an item, such as, for example, an electric resistance heating element, a heat lamp, or an induction heating element.

Heat source 206 is desirably an electric resistance heating element but, if zone refining unit 16 is used to refine only gallium, then heat source 206 may be a heat lamp. Pan 200 has a hub 205 positioned in the center of interior surface 202. A drive shaft 208 is mounted on and extends upwardly from hub 205. Drive shaft 208 is provided so that pan 200 can be rotated. Drive shaft 208 is driven, either directly or indirectly, by a motor 210. An exterior surface 212 of pan 200 can optionally be in heat transfer contact with a cooling element 213. Cooling element 213 can be a refrigeration unit utilizing freon or a cooling bath. Cooling element 213 is shown in FIG. 6 as a cooling bath 214. Cooling bath 214 can be an ice bath, a chilled isopropanol bath or a dry ice bath.

A transparent cover 216 is positioned over interior surface 202 of pan 200 to minimize the exposure to dust particles of the group III element being refined. Desirably, cover 216 is formed from quartz. Cover 216 has a center aperture 217 formed therein so that cover 216 fits on drive shaft 208 and be slidably, if not removably, mounted on drive shaft 208. Cover 216 is covered with an opaque mask 218, which is positioned between heat source 206 and cover 216. Mask 218 also has a center aperture 219 which accommodates drive shaft 208 and further has at least one slot 220 formed therein. The slot 220 is provided so that the heat from the heat source 206 can be concentrated on a specific area of the group III element. Mask 218 is also desirably slidably, and, more desirably, removably mounted on drive shaft 208. Slot 220 desirably is rectangular and is positioned radially on mask 218. Slot 220 is provided so that only a portion of the interior surface 202 of pan 200 is exposed to heat from heat source 206 at any one time.

Because it too comes into contact with corrosive group III elements, the zone refining pan 200 should be formed from a material which is resistant to the corrosive effects of the group III element being refined. Additionally, the material must have a low thermal conductivity so as to maximize the temperature gradient for the refining process. Useful materials which can be used to form pan 200, if the group III metal is gallium, are plastics, such as polyethylene, polytetrafluoroethylene or polycarbonate; non-metallic materials, such as boron nitride, glass, quartz, and graphite; and ceramic materials. Desirably, if pan 200 is used to refine indium then pan 200 will be formed from a ceramic material.

Figure 4:
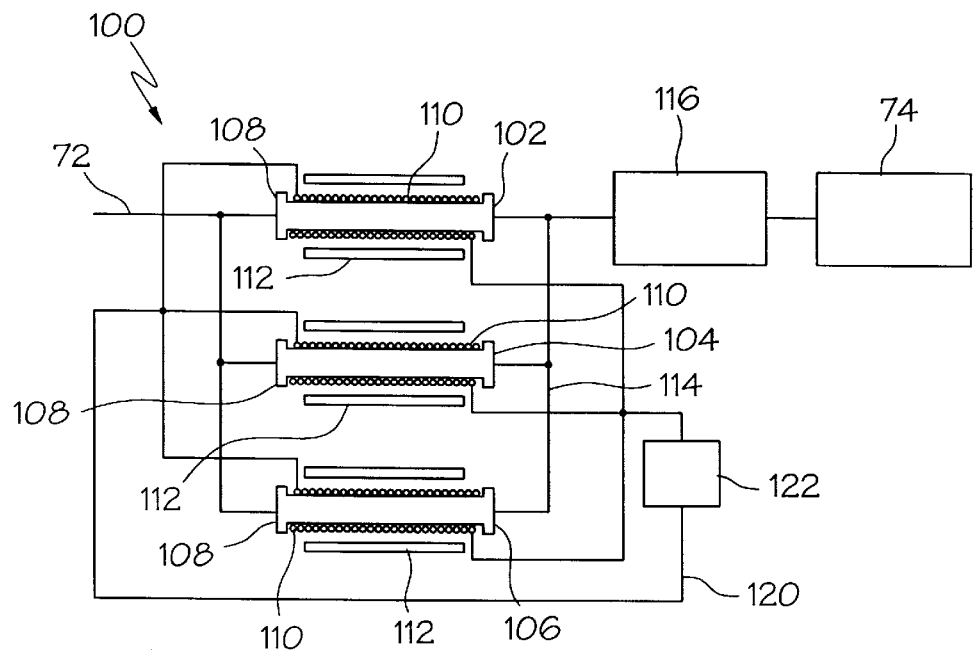
FIG. 4 is a schematic view of a condensing unit which can be used to recover arsenic.

As shown in FIG. 4, one desirable embodiment 100 of the condensing unit 14 comprises a first condenser 102, a second condenser 104, and a third condenser 106. Each condenser 102, 104 and 106 has a body 108 which is surrounded by a cooling coil 110. Cooling coil 110 is in heat transfer contact with body 108. A heating element 112 is positioned in heat transfer contact with each cooling coil 110. A gas line 114 is provided so that vapor can flow from condenser 102 to condenser 104 and from condenser 104 to condenser 106. A series are valves, not shown, are provided so that the condensers 102, 104 and 106 can be isolated from each other. The group V element vapor is drawn through condensers 102 and 104 and gas line 114 by vacuum pump 74. A molecular sieve 116 is positioned between the end of gas line 114 and vacuum pump 74 to prevent any toxic vapors or particulate matter from being drawn into vacuum pump 116. Coolant flows to cooling coil 110 of condenser 102 through tubing 120. Coolant is pumped through cooling cools 110 and tubing 120 by means of a fluid pump 122, which can be either a conventional fluid pump or a source of water such as a tap.

Figure 5:
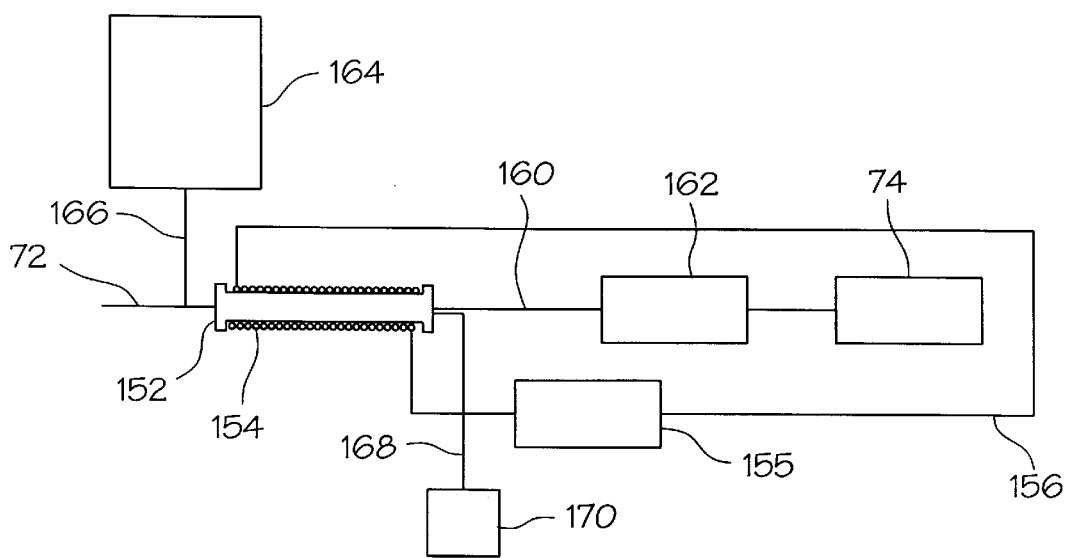
FIG. 5 is a schematic view of a condensing unit which can be used to recover phosphorus.

Another desirable aspect 150 of the condensing unit 14 is shown in FIG. 5. With aspect 150, the condensing unit 14 comprises a single condenser 152. Condenser 152 is surrounded by a cooling coil 154 which is in heat transfer contact with condenser 152. Coolant is pumped into cooling coil 154 by a pump 155 through a coolant line 156. Pump 155 can be a conventional fluid pump or a source of fluid such as a water tap. The group V element vapor is drawn into condenser 152 through conduit 72 by vacuum pump 74. Vacuum pump 74 is connected to condenser 152 by a conduit 160. A molecular sieve 162 is desirably positioned between condenser 152 and vacuum pump 74. A liquid reservoir 164 is positioned to feed a solution into condenser 152 through a line 166. Condenser 152 also includes a drainage line 168 through which condenser 152 can be drained into a collection reservoir 170.

Although it is not shown in the drawings, the apparatus 10 may include an associated source of an inert gas. The inert gas is desirably fed directly into reaction chamber 44 of reactor 12. A person of skill in the art would be quite capable of hooking the source of inert gas into the apparatus 10.

The apparatus 10 of the present invention functions in the following manner. Solid waste materials developed during the manufacturing process of group III-V materials are placed in a suitable container, such as a crucible or other container formed from a heat resistant material and a material which is inert to the corrosive effects of liquid group III metals, and placed in the reaction chamber 44 of reactor 12. The air in reaction chamber 44 is evacuated by vacuum pump 74. Desirably, the pressure in reaction chamber 44 is reduced to from about $10^{-1}$ Torr to about $10^{-5}$ Torr. Reactor core 40 is then heated through shell 20 by heat source 30. The temperature in reaction chamber 44 is monitored by a temperature sensing device, such as thermocouple 29, inserted through aperture 28 in top 22 of shell 20 and through aperture 47 in top portion 42 of reactor core 40. As reactor 12 is heated, the group III-V material separates into a liquid group III element and a group V element vapor. The reduced pressure in reaction chamber 44 causes the group V element vapor to be drawn out of reaction chamber 44 through conduit 26. The group III element and associated waste materials are allowed to solidify as the reaction chamber 44 cools to ambient temperature under the reduced pressure.

During the thermal separation process, the group V element vapor is drawn out of reactor 12 through conduit 26 and through conduit 72 into condenser 70 by vacuum pump 74. Coolant is circulated through cooling coils 80 which surround condenser 70 causing the group V element vapor to cool and condense to a solid. The coolant, as stated above, is circulated to cooling coils 80 through coolant line 84 by coolant pump 82. At the completion of the separation process, the apparatus 10 is brought back to atmospheric pressure and the solidified group V element can be either removed from condenser 70 and disposed of or refined further.

After the separation reaction has been completed, the container is removed from the reaction chamber 44 and the partially purified group III element is separated from the waste materials. If further purification of the recovered group III element is necessary, the group III element is then transferred to the zone refining unit 16 in which the group III element is placed in pan 200. After the group III element is transferred to pan 200, cover 216 is placed over pan 200 and mask 218 is positioned over cover 216 between cover 216 and heat source 206. The heat source 206 is then heated to a temperature above the melting point and below the boiling point of the group III element. To refine the group III element, pan 200 is rotated beneath heat source 206. The pan 200 is typically rotated at about one rotation per hour, but one skilled in the art will understand that, depending on the desired purity of the final product, the pan speed may be varied. As pan 200 rotates, only a portion of the interior surface 202 of pan 200 is exposed to the heat from heat source 206 at any one time because slot 220 in mask 218 does not rotate. For that reason, only the portion of the interior surface 202 of pan 200 which is beneath heat source 206 at a particular time is heated.

Any impurities in the group III element are moved along with the melt while the portion of the metal which is left behind is purified. Optionally, to ensure that the group III element solidifies after the impurities have been carried out of the liquid phase, pan 200 can be positioned in heat transfer contact with cooling element 213. By continually rotating pan 200 and removing the impurities, the group III element can be refined to a point at which it can be reused to make III-V metal semiconductors. The number of rotations of pan 200 determines the final purity of the refined group III element, i.e., the more rotations pan 200 undergoes, the more pure the recovered group III element will be. The final purity is also determined by the speed at which pan 200 is rotated. Slower speeds for pan 200 will produce a more pure final product.

The slag material is prepared for waste disposal as required by local or national regulations and ultimately disposed of in an appropriate manner.

In another aspect of this invention, if the group III-V material being refined includes arsenic, for example from a GaAs semiconductor manufacturing process, then embodiment 100 of condensing unit 14 is used in the apparatus 10 to recover and refine the arsenic. Upon the thermal separation of the group III-V material, arsenic vapor is drawn out of reaction chamber 44 through conduit 26 and into condenser 102 through conduit 72. Once in condenser 102, the arsenic vapor is condensed into a solid by cooling coil 110 which surrounds condenser 102. As the vapor is being drawn into condenser 102, condenser 102 is isolated from condensers 104 and 106 by the appropriate valves. After the thermal separation process has been completed, condenser 102 is isolated from the reactor 12 by closing the appropriate valves. The valve between condenser 102 and condenser 104 is then opened while condenser 104 is isolated from condenser 106. Condenser 102 is then heated by the heating element 112, which is positioned near condenser 102, and the arsenic solid is sublimated to produce arsenic vapor. The arsenic vapor is then drawn into condenser 104 through gas line 114 and condensed a second time. After the arsenic vapor has been transferred to condenser 104, condenser 104 is isolated from condenser 102 by adjusting the appropriate valve and opened to condenser 106. Again the arsenic solid is sublimated by heating element 112 which is positioned near condenser 104. The arsenic vapor is then drawn into condenser 106 through gas line 114 and condensed in condenser 106. Condenser 106 is then isolated from condenser 104. The arsenic solid can then be recovered from condenser 106 and recycled into the semiconductor manufacturing process. One skilled in the art will appreciate that the number of condensers employed in condensing unit 14 can be varied depending upon the desired purity of the recovered arsenic product.

One skilled in the art will also appreciate that if further purification of the arsenic is desired, each condenser 102, 104 and 106 can be cleaned after the arsenic vapor has been sublimated and drawn out of it. The positioning of the condensers 102, 104 and 106 can then be changed so that the solid arsenic is again sublimated through two condensers. For example, condenser 106 which contains the solidified arsenic can be moved to the position of condenser 102, condenser 102 can be moved to the position of condenser 104 and condenser 104 can be moved to the position of condenser 106. This rotation of the positioning of the condensers 102, 104 and 106 can be done repeatedly until the desired purity level is achieved. Once the positioning of condensers 102, 104 and 106 has been rotated, the sublimating and condensing process can take place again. Alternately, the system can be designed so that condenser 106 is connected by a gas line to condenser 102 so that, once condenser 102 has been cleaned, the arsenic can be sublimated in condenser 106 and transferred to condenser 102 to be recondensed. These are only two of many possible arrangements and uses of the condensers 102, 104 and 106 in embodiment 100.

In still another embodiment of the present invention, if the group III-V material contains phosphorus, for example from a GaP or an InP semiconductor manufacturing process, then the embodiment 150 of condenser 14 can be used in the apparatus 10 to reduce the volatility of the recovered elemental phosphorus. In embodiment 150 of condensing unit 14, phosphorus vapor produced during the thermal separation of the III-V semiconductor material is collected in condenser 152 and condensed by the flow of coolant through cooling coil 154. After completion of the thermal separation process, the pressure in the apparatus 10 and in condenser 152 is returned to atmospheric pressure with an inert gas. Once the pressure in condenser 152 is returned to atmospheric, the elemental phosphorus is subjected to an oxidation reaction to reduce its volatility. An oxidation fluid is transferred from liquid reservoir 164 through line 166 into condenser 152 in which the oxidation reaction takes place. The phosphorus is then oxidized by the oxidation fluid and drained from condenser 152 through drainage line 168 and into collection reservoir 170. The oxidized phosphorus can then be used as a fertilizer or disposed. Useful oxidizing fluids include aqueous salts of transition metals such as copper, silver and cobalt.

A person of skill in the art will appreciate that the processes described above do not necessarily have to be carried out in the apparatus described above. For example, the group III-V material can be placed in a container and thermally separated in an oven. The oven can be connected with a vacuum system to draw off the group V element vapor into a condensing apparatus. The container can then be removed from the oven and the group III element can be separated from the remaining group III-V material and slag material. The group III element can then be refined in any conventional manner or by using the zone refining unit described above.

Although the process and apparatus described herein have been described herein with reference to waste products derived from the manufacture of semiconductors, one of skill in the art will appreciate that both the processes and apparatus of the present invention are useful to recover the components of the group III-V materials regardless of how those materials are generated.

Although it has been described herein that the temperature in reaction chamber 44 can be monitored with a thermocouple, one skilled in the art will appreciate that, especially in larger scale operations, that a pyrometer could also be used.

Having described the invention in detail and by reference to preferred embodiments thereof, it will be apparent that modifications and variations are possible without departing from the scope of the invention which is defined in the appended claims.

What is claimed is:

1. A method for the recovery of the components of solid waste materials containing group III and group V material comprising:

heating, under a reduced pressure in the presence of an inert gas, solid waste materials which contain group III and group V material to cause said group III and group V material to separate into a group III element and a group V element vapor;

drawing off said group V element vapor;

condensing said group V element vapor to produce a condensed group V element solid;

oxidizing said condensed group V element solid; and zone refining said group III element to produce a purified group III element.

2. The method of claim 1 wherein the step of condensing said group V element vapor is conducted through a heated line.

3. The method of claim 2 further including the steps of sublimating said condensed group V element solid and recondensing said sublimated group V element to produce a more pure group V element solid.

4. The method of claim 1 wherein said reduced pressure is from about $10^{-1}$ Torr to about $10^{-5}$ Torr.

5. The method of claim 1 wherein said solid waste materials are heated to a temperature from about the melting point of the group III and V material minus 200° C. to about the melting temperature of the group III and V material.

6. The method of claim 1 wherein said condensed group V element is oxidized with an aqueous salt of a transition metal.

7. The method of claim 1 further including the step of pelletizing fine particles of said solid waste materials before heating said solid waste materials.

8. The method of claim 1 wherein said group III and V material is selected from the group consisting of gallium phosphide, gallium arsenide, gallium antimonide, indium phosphide, indium arsenide, and indium antimonide.

9. The method of claim 8 wherein said group III and V material is gallium arsenide.

10. The method of claim 8 wherein said group III and V material is indium phosphide.

11. The method of claim 8 wherein said group III and V material is gallium phosphide.

12. A method for the recovery of a group III element from solid waste materials containing a group III element phosphide, wherein the method comprises:

heating under a reduced pressure solid waste materials containing group III element phosphide to separate said solid waste materials into a group III element and phosphorus vapor;

drawing off said phosphorus vapor;

condensing said phosphorus vapor into solid phosphorus;

oxidizing said solid phosphorus; and zone refining said group III element.

13. The method of claim 12 wherein said solid phosphorus is oxidized with an aqueous salt of a transition metal.

14. The method of claim 13 wherein said aqueous salt of a transition metal is copper sulfate and the step of oxidizing of said solid phosphorus produces elemental copper which is recovered.

15. The method of claim 12 wherein said reduced pressure is from about $10^{-1}$ Torr to about $15^{-5}$ Torr.

16. The method of claim 12 wherein said solid waste materials are heated to a temperature from about the melting point of the group III element phosphide minus 200° C. to about the melting temperature of the group III element phosphide.

17. The method of claim 12 wherein said phosphorus vapor is drawn off through a heated line.

18. The method of claim 12 further including the step of pelletizing fine particles of said solid waste materials before heating said solid waste materials.

19. The method of claim 12 wherein said group III element phosphide is indium phosphide.

20. The method of claim 12 wherein said group III element phosphide is gallium phosphide.

* * * * *

UNITED STATES PATENT AND TRADEMARK OFFICE
CERTIFICATE OF CORRECTION

PATENT NO. : 6,126,719
DATED : October 3, 2000
INVENTOR(S) : Sturgill et al.

It is certified that error appears in the above-identified patent and that said Letters Patent is hereby corrected as shown below:

Column 16, Line 38, "to about $15^{-5}$ Torr" should be -- to about $10^{-5}$ Torr --.

Signed and Sealed this

Eighth Day of May, 2001

Attest:

NICHOLAS P. GODICI

Attesting Officer

Acting Director of the United States Patent and Trademark Office